United States Patent Office 3,410,829
Patented Nov. 12, 1968

3,410,829
PREPARATION OF HIGHLY POLYMERIC POLYESTERS IN THE PRESENCE OF TITANIUM IODATES
Lambert Gaston Jeurissen, Mortsel-Antwerp, and André Jan Conix, Antwerp, Belgium, assignors to Gevaert-Agfa N.V., Mortsel, Belgium, a Belgian company
No Drawing. Filed Mar. 10, 1966, Ser. No. 533,242
Claims priority, application Great Britain, Mar. 11, 1965, 10,410/65
6 Claims. (Cl. 260—75)

ABSTRACT OF THE DISCLOSURE

Highly polymeric polyesters are obtained from an aromatic dicarboxylic acid or an ester-forming derivative thereof and a glycol by (I) forming a glycol di-carboxylate from the above-mentioned starting materials, and (II) polycondensing the glycol di-carboxylate in the presence of a titanium iodate.

---

The invention relates to improvements in the manufacture of polyesters, in particular highly polymeric polyethylene terephthalate.

Highly polymeric polyethylene terephthalate has great value as fibre and film material. In general it is made by ester-interchange reaction between an ester of terephthalic acid and ethylene glycol whereby bis(beta-hydroxyethyl) terephthalate is formed. This compound is then polycondensed under reduced pressure and at high temperature.

The prior art contains a large number of disclosures regarding the use of catalysts in the manufacture of fibre- and film-forming linear condensation-type polyester. Among numerous useful catalysts for preparing polyesters are zinc acetate, antimony trioxide, titanium compounds such as titanium tetrafluoride, titanium dioxide, alkyl and aryl titanates, titanium tetrachloride, titanium dichloride diacetate and compounds of other metals.

According to the invention an improved process is provided for the manufacture of highly polymeric polyesters, obtained by reacting a glycol with an aromatic dicarboxylic acid or an ester-forming derivative thereof and polycondensing the resulting glycol dicarboxylate, characterized in that at least during the polycondensation step a titanium iodate compound is present, which is soluble in the reaction mixture.

These titanium iodate compounds are useful for the catalysis of both ester-interchange and polycondensation reaction.

If preferred, any othe ester-interchange catalyst, such as zinc acetate, or a mixture of such substances may be used as the ester-interchange catalyst, whereas the titanium iodate compounds of the invention are used as the polycondensation catalysts. Alternatively the titanium iodate compounds may be used as catalyst, especially in the polycondensation step, together with other known polycondensation catalysts or mixtures thereof.

Suitable titanium iodate compounds are for instance the following:

Titanium oxide di-iodate: $TiO(IO_3)_2$
Titanium dihydroxide di-iodate: $Ti(IO_3)_2(OH)_2$; its hydrate: $Ti(IO_3)_2(OH)_2 \cdot 2H_2O$
Titanium iodate: $Ti(IO_3)_4$; its hydrate: $Ti(IO_3)_4 \cdot 2H_2O$
Titanium dihydrogen hexaiodate: $TiH_2(IO_3)_6$ its hydrate: $TiH_2(IO_3)_6 \cdot H_2O$
and the alkali metal salts and ammonium salts of titanium dihydrogen hexaiodate, such as $TiNa_2(IO_3)_6$ and $Ti(NH_4)_2(IO_3)_6$.

Many of these compounds are described in Z. für Anorg. Chem. 208, 100 (1932).

The use of the titanium iodate compounds of the invention as catalysts in the preparation of high molecular weight linear polyesters presents various improvements in comparison to the catalyst proposed in the prior art. The titanium iodate compounds of the invention are decomposed by polycondensation under reduced pressure and at high temperatures, whereby the reaction mass becomes vividly coloured. By further heating under reduced pressure, the anions, which are volatile, are distilled off. This prevents the formation of side reactions. Hence the colouration gradually disappears, leaving the finally produced polyester substantially colourless and of high molecular weight.

Very small amounts of titanium iodate compounds according to the invention suffice to effectively catalyze the ester-interchange and/or the polycondensation reaction. This small amount constitutes a further improvement over the prior art.

The known antimony catalysts in general give polyesters with relatively low melting points. Further, their catalytic action is relatively slow. The titanium iodate compounds of the present invention, however, are much more active in catalyzing the ester-interchange and/or polycondensation, and in the same time give polyesters with much higher melting points, which indicates a low diethylene glycol content, and results in a higher modulus of elasticity of the films manufactured from the polyesters obtained.

Although the description and statements of the invention have especially interest in view of the use of the novel catalysts in the preparation of polyethylene terephthalate, the titanium iodate compounds can, in general, be employed in the preparation of all polyesters involving an ester-interchange reaction between a dicarboxylic acid ester, for instance a pyridine dicarboxylic acid ester, or mixtures of different dicarboxylic acid esters and a glycol, mixtures of glycols, or other diols, such as cyclohexane dimethanols, followed by polycondensation of the resulting glycol and/or diol dicarboxylates.

The titanium iodate compounds do not interfere with stabilizing agents such as those phosphates or phosphites that are known to be added to the polycondensation re- action mxiture.

The following examples are cited to illustrate the invention. They are not intended to limit it in any way. In these examples the inherent viscosity $\eta_{inh}$, which is a measure of the degree of polycondensation, is determined at 25° C. at a concentration of 0.5 gram per 100 ccs. in a 60:40 mixture of phenol and sym.-tetrachloroethane. $\eta_{inh}$ is calculated from the equation $$\eta_{inh} = \frac{\ln \eta_{rel}}{c}$$

wherein $\eta_{rel}$ is the relative viscosity and $$\eta_{rel} = \frac{\text{flow time of solution}}{\text{flow time of solvent}}$$

and $c$ is the concentration (0.5).

The crystalline melting point is determined by heating a crystallized sample of polyester on the heating stage of a polarizing microscope. The temperature of the hot stage is raised at a rate of 0.8° C. min. The crystalline melting point is obtained by noting the temperature at which between crossed nicols the last trace of birefringence disappears.

At the end of the polycondensation period the colour of the molten polyester is visually compared with arbitrary colour standards consisting of aqueous solutions of Du Pont Pontamine Catechu 3G dye (C.I. 36,300) according to the following system of colour ratings:

0=pure water
1=0.00025 gram of the above dye dissolved in 100 ml. of water
2=twice as much dye as in 1
3=three times as much dye as in 1
4=four times as much dye as in 1, etc.

Example 1

38.8 parts of dimethyl terephthalate (0.2 mole) and 27.3 parts of ethylene glycol (0.44 mole) are placed in a 25 mm. inside diameter glass polymerization tube, and 8.3 mg. of titanium oxide di-iodate ($1.10^{-4}$ mole/mole of dimethyl terephthalate) are added. The reactants are heated for 2½ h. at 197° C. at atmospheric pressure. A continuous stream of dry nitrogen is introduced through a capillary tube reaching to the bottom of the reaction tube. The ester-interchange being finished, the temperature is gradually raised over 30 min. to 282° C. and the unreacted ethylene glycol distilled off. The pressure is reduced to 0.1 to 0.3 mm. of Hg, while dry nitrogen is bubbled through the melt. After 2½ h. at 282° C., vacuum is released and polyethylene terephthalate polyester is obtained having an inherent viscosity $\eta_{inh}=0.62$. The polyester is clear, has a colour number of 8, and melts at 265° C., which indicates a very low diethylene glycol content.

Example 2

38.8 parts of dimethyl terephthalate (0.2 mole) and 27.3 parts of ethylene glycol (0.44 mole) are placed in a 25 mm. inside diameter glass polymerization tube, and 4.1 mg. of titanium oxide di-iodate ($5.10^{-5}$ mole/mole of dimethylterephthalate) are added. The reactants are heated for 3½ h. at 197 ° C. at atmospheric pressure. A continuous stream of dry nitrogen is introduced through a capillary tube reaching to the bottom of the reaction tube. The ester-interchange being finished, the temperature is gradually raised over 30 min. to 282° C. and the unreacted ethylene glycol distilled off. The pressure is reduced to 0.1 to 0.3 mm. of Hg, while dry nitrogen is bubbled through the melt. After 3 h. at 282° C., vacuum is released and polyethylene terephthalate polyester is obtained having an inherent viscosity $\eta_{inh}=0.65$. The polyester is clear, has a low colour number of 6, and melts at 265.5° C., which indicates a very low diethylene glycol content.

Example 3

38.8 parts of dimethyl terephthalate (0.2 mole) and 27.3 parts of ethylene glycol (0.44 mole) are placed in a 25 mm. inside diameter glass polymerization tube, and 2.5 mg. of titanium oxide di-iodate ($3.10^{-5}$ mole/mole of dimethyl terephthalate) are added. The reactants are heated for 6 h. at 197° C. at atmospheric pressure. A continuous stream of dry nitrogen is introduced through a capillary tube reaching to the bottom of the reaction tube. The ester-interchange being finished, the temperature is gradually raised over 30 min. to 282° C. and the unreacted ethylene glycol distilled off. The pressure is reduced to 0.1 to 0.3 mm. of Hg, while dry nitrogen is bubbled through the melt. After 6 h. at 282° C., vacuum is released and polyethylene terephthalate polyester is obtained having an inherent viscosity $\eta_{inh}=0.58$. The polyester is clear, and has a low colour number of 5.

Example 4

38.8 parts of dimethyl terphthalate (0.2 mole) and 27.3 parts of ethylene glycol (0.44 mole) are placed in a 25 mm. inside diameter glass polymerization tube, and 15 mg. of titanium iodate ($1.10^{-4}$ mole/mole of dimethyl terephthalate) are added. The reactants are heated for 2½ hrs. at 197° C. at atmospheric pressure. A continuous stream of dry nitrogen is introduced through a capillary tube reaching to the bottom of the reaction tube. The ester-interchange being finished, the temperature is gradually raised over 30 min. to 282° C. and the unreacted ethylene glycol distilled off. The pressure is reduced to 0.1 to 0.3 mm. of Hg, while dry nitrogen is bubbled through the melt. After 3 hrs. at 282° C., vacuum is released and polyethylene terephthalate polyester is obtained having an inherent viscosity $\eta_{inh}=0.60$. The polyester is clear and has a colour number of 9.

Example 5

388 parts of dimethyl terephthalate (2 mole) and 275 parts of ethylene glycol (4.4 mole) are placed in a stainless steel autoclave equipped with a stirrer, a gas inlet tube and a rectifying column. After adding 60 mg. of titanium oxide di-iodate, the mixture is stirred and heated for 3 hrs. at 197° C. at atmospheric pressure, while a continuous stream of dry nitrogen is introduced. The ester-interchange being finished, the temperature is gradually raised over 1 hr. to 282° C. and the unreacted ethylene glycol distilled off. The pressure is reduced to 0.1 to 0.3 mm. of Hg. After 3 hrs. at 282° C., vaccum is released and polyethylene terephthalate polyester is obtained having an inherent viscosity $\eta_{inh}=0.67$. The polyester is clear and has a low colour number of 7.

Example 6

38.2 parts of dimethyl terephthalate (0.2 mole) and 27.3 parts of ethylene glycol (0.44 mole) are placed in a 25 millimeter inside diameter glass polymerization tube, whereupon 4.1 mg. of titanium oxide di-iodate ($5.10^{-5}$ mole/mole of dimethyl terephthalate) are added. The reactants are heated for 3½ hours at 197° C. at atmospheric pressure. A continuous stream of dry nitrogen is introduced through a capillary tube reaching to the bottom of the reaction tube. The ester-interchange being finished, the temperature is gradually raised over 30 min. to 270° C. and the unreacted ethylene glycol distilled off. The pressure is reduced to 0.1 to 0.3 millimeter of mercury while the reaction mixture is stirred under dry nitrogen. After 4 hours at 270° C., vacuum is released and polyethylene terephthalate polyester is obtained having a viscosity $\eta_{inh}=0.75$. The polyester is clear and has a light color number 7.

Example 7

38.8 parts of dimethyl terephthalate (0.2 mole) and 27.3 parts of ethylene glycol (0.44 mole) are placed in a 25 millimeter inside diameter glass polymerization tube, whereupon 4.1 mg. of titanium oxide di-iodate ($5.10^{-5}$ mole/mole of dimethyl terephthalate) are added. The reactants are heated for 3½ hours at 197° C. at atmospheric pressure. A continuous stream of dry nitrogen is introduced through a capillary tube reaching to the bottom of the reaction tube. The ester-interchange being finished, the temperature is gradually raised over 30 min. to 282° C. and the unreacted ethylene glycol distilled off. The pressure is reduced to 0.1 to 0.3 millimeter of mercury while the reaction mixture is stirred under dry nitrogen. After 3 hours at 282° C., vacuum is released and polyethylene terephthalate polyester is obtained having a viscosity $\eta_{inh}=0.75$. The polyester is clear and has a light colour number 6.

Example 8

38.8 parts of dimethyl terephthalate (0.2 mole) and 27.3 parts of ethylene glycol (0.44 mole) are placed in a 25 millimeter inside diameter glass polymerization tube, whereupon 0.8 mg. of titanium oxide di-iodate ($1.10^{-5}$ mole/mole of dimethyl terephthalate), together with 0.9 mg. of zinc acetate ($2.10^{-5}$ mole/mole of dimethyl terephthalate) are added. The reactants are heated for 3½ hours at 197° C. at atmospheric pressure. A continuous stream of dry nitrogen is introduced through a capillary tube reaching to the bottom of the reaction tube. The ester-interchange being finished, the temperature is gradually raised over 30 min. to 282° C. and the unreacted ethylene glycol distilled off. The pressure is reduced to 0.1 to 0.3 millimeter of mercury while the reaction mixture is stirred under dry nitrogen. After 5 hours at 282° C., vacuum is released and polyethylene terephthalate polyester is obtained having an inherent viscosity of 0.72. The polyester is clear, has a light colour number 4, and melts at 266° C., which indicates a very low diethylene glycol content.

Example 9

38.8 parts of dimethyl terephthalate (0.2 mole) and 27.3 parts of ethylene glycol (0.44 mole) are placed in a 25 millimeter inside diameter glass polymerization tube, whereupon 0.8 mg. of titanium oxide di-iodate ($1.10^{-5}$ mole/mole of dimethyl terephthalate), together with 0.9 mg. of zinc acetate dihydrate ($2.10^{-5}$ mole/mole of dimethyl terephthalate) are added. The reactants are heated for 3½ hours at 197° C. at atmospheric pressure. A continuous stream of dry nitrogen is introduced through a capillary tube reaching to the bottom of the reaction tube. The ester-interchange being finished, the temperature is gradually raised over 30 min. to 282° C., and the unreacted ethylene glycol distilled off. Then 2.6 mg. of triphenyl phosphate ($4.10^{-5}$ mole/mole of dimethyl terephthalate) are added as stabilizer. The pressure is reduced to 0.1 to 0.3 millimeter of mercury, while the reaction mixture is stirred under dry nitrogen. After 6 hours at 282° C., vacuum is released and polyethylene terephthalate polyester is obtained having an inherent viscosity $\eta_{inh}=0.73$. The polyester is clear, has a light colour number 5, and melts at 264.5° C., which indicates a very low diethylene glycol content.

We claim:
1. In a process for the manufacture of highly polymeric polyesters in which (I) a glycol is reacted with a compound selected from the group consisting of an aromatic dicarboxylic acid and an ester-forming derivative thereof, and (II) the resulting glycol dicarboxylate is condensed to form polyesters, the improvement comprising the use at least during the polycondensation step of a titanium iodate catalyst which is soluble in the reaction mixture.

2. A process according to claim 1 in which the glycol is ethylene glycol.

3. A process according to claim 1 in which the aromatic dicarboxylic acid is terephthalic acid.

4. A process according to claim 1 in which the glycol is ethylene glycol and the ester-forming derivative is dimethyl terephthalate.

5. A process according to claim 1 in which the titanium iodate catalyst is titanium oxide di-iodate.

6. A process according to claim 1 in which the titanium iodate catalyst is titanium iodate.

References Cited

UNITED STATES PATENTS

| 3,326,965 | 6/1967 | Schultheis et al. | 260—475 |
| 2,729,619 | 1/1956 | Sullivan | 260—75 |

WILLIAM H. SHORT, *Primary Examiner.*

LOUISE P. QUAST, *Assistant Examiner.*